(12) United States Patent
Launay et al.

(10) Patent No.: US 11,802,050 B2
(45) Date of Patent: Oct. 31, 2023

(54) METHOD FOR PRODUCING HALOAMINES AND HALOAMINE SOLUTIONS

(71) Applicant: Buckman Laboratories International, Inc., Memphis, TN (US)

(72) Inventors: Bruno Launay, Wasquehal (FR); Dimitri Kuznetsov, Memphis, TN (US); Thomas McNeel, Memphis, TN (US)

(73) Assignee: Buckman Laboratories International, Inc., Memphis, TN (US)

( * ) Notice: Subject to any disclaimer, the term of this patent is extended or adjusted under 35 U.S.C. 154(b) by 932 days.

(21) Appl. No.: 16/697,054

(22) Filed: Nov. 26, 2019

(65) Prior Publication Data

US 2020/0172398 A1 Jun. 4, 2020

Related U.S. Application Data

(60) Provisional application No. 62/773,819, filed on Nov. 30, 2018.

(51) Int. Cl.
*C01B 21/09* (2006.01)
*C01B 11/06* (2006.01)
*A01B 59/00* (2006.01)
*C25B 1/26* (2006.01)
*A01N 59/00* (2006.01)

(52) U.S. Cl.
CPC ............ *C01B 21/091* (2013.01); *A01N 59/00* (2013.01); *C01B 11/06* (2013.01); *C25B 1/26* (2013.01)

(58) Field of Classification Search
CPC ................................ A01N 59/00; A01N 25/02
See application file for complete search history.

(56) References Cited

U.S. PATENT DOCUMENTS

| | | | |
|---|---|---|---|
| 2012/0328504 A1* | 12/2012 | Debiemme-Chouvy | ................... C25B 1/265 423/413 |
| 2014/0018432 A1* | 1/2014 | Sharoyan | ................. C25B 3/27 514/588 |
| 2014/0322362 A1 | 10/2014 | Frim et al. | |
| 2016/0157494 A1* | 6/2016 | Boal | ....................... A01N 59/02 424/661 |
| 2018/0177191 A1* | 6/2018 | Corcoran | ............... A01N 33/14 |
| 2020/0172398 A1* | 6/2020 | Launay | ................ C02F 1/4674 |

FOREIGN PATENT DOCUMENTS

| | | |
|---|---|---|
| EP | 2501647 B1 | 2/2014 |
| WO | 2018125531 A1 | 7/2018 |

OTHER PUBLICATIONS

International Search Report for PCT/US2019/063290, dated Mar. 19, 2020.
Hooper, John. "On-Site Generation of Sodium Hypochlorite Basic Operating Principles and Design Considerations," in 68th Annual Water Industry Engineers and Operators Conference, (Sep. 7-8, 2005), pp. 59-66.

\* cited by examiner

*Primary Examiner* — Joseph D Anthony
(74) *Attorney, Agent, or Firm* — MCBEE MOORE & VANIK IP, LLC

(57) ABSTRACT

A method for producing a haloamine solution with reduced amounts of halogen oxyanions including (a) the on-site generation of a halogen-containing oxidant, such as a solution and (b) reacting on-site the halogen-containing oxidant with a nitrogen source, to thereby produce the haloamine solution.

11 Claims, 5 Drawing Sheets

METHOD FOR PRODUCING HALOAMINES AND HALOAMINE SOLUTIONS

CROSS-REFERENCE TO RELATED APPLICATIONS

This application is a Non-Provisional Application which claims priority to U.S. Provisional Application No. 62/773,819, filed 30 Nov. 2018, the content of which is incorporated herein by reference in its entirety. The present invention relates to United States Patent Publication 2018/0177191 A1 published Jun. 28, 2018 and assigned to Buckman Laboratories. The present invention also relates to U.S. Provisional Application No. 62/624,186 filed on Jan. 31, 2018. The contents of both documents are incorporated by reference in their entireties.

FIELD OF THE INVENTION

The present invention relates to methods for producing haloamines, such as chloramines, that are useful as biocidal agents. The invention also relates to haloamines solutions with reduced amounts of harmful halogen polyoxyanions such as perchlorate, chlorate, chlorite, and/or bromate, bromite, or perbromite.

BACKGROUND OF THE INVENTION

Biocidal solutions of haloamines, particularly monochloramine (MCA), have generated a great deal of interest for control of microbiological growth in a number of industries, including the dairy industry, the food and beverage industry, the pulp and paper industries, the oil and gas industries, the fruit and vegetable processing industries, various canning plants, the poultry industry, the beef processing industry, and miscellaneous other food processing applications.

Haloamines can be formed by reacting a dilute ammonia solution or at least one ammonium salt or other nitrogen source with at least one halogen-containing oxidant. The required parent reagents are commonly available as concentrated solutions. The parent solutions are commonly stored near a haloamine generator in which they are combined in defined proportions to form the biocide treatment. Unfortunately, storage results in a degradation of actives in the parent solutions. In addition to creating difficulties for maintaining the proper ratio of reactants, the degradation of halogen-containing oxidants results in the accumulation of harmful halogen polyoxyanions such as chlorite, chlorate, perchlorate, and/or analogous bromine ions including bromate.

Halogen oxyanions can be generally presented by the formula:

where X is a halogen atom such as fluorine, chlorine, bromine, iodine, and astatine bonded with up to n oxygen atoms. The halogen oxyanions of interest to the present invention can be listed in the order of increasing number of oxygen atoms as follows:

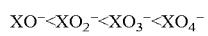

The halogen oxyanions containing more than one oxygen atom, or halogen polyoxyanions, have been found to be particularly harmful to human health. For example, the perchlorate and chlorate ions have been found to inhibit thyroid iodine uptake and thus are a potential health concern for children, especially those with mild or moderate iodine deficiency. Bromate has been found mutagenic in vitro and in vivo and classified as a probable human carcinogen under the 1986 EPA Guidelines for Carcinogen Risk Assessment.

For this reason, various regulatory agencies are restricting or banning the presence of halogen polyoxyanions in certain applications. Since commercially-available halogen-containing oxidant solutions will contain significant amounts of halogen polyoxyanions formed during storage that will end up in produced haloamine solutions, other methods of producing halogen-containing precursors of haloamines are needed.

Thus, there is a need in the art for methods of preparing haloamine solutions with reduced amounts of halogen polyoxyanions. There is also need in the art for haloamine solutions with reduced amounts of harmful compounds, such as halogen polyoxyanions.

The current invention provides a solution to these needs.

SUMMARY OF THE INVENTION

The present invention provides methods of producing a haloamine solution with reduced amounts of halogen polyoxyanions comprising (a) the on-site generation of a halogen-containing oxidant solution and (b) reacting on-site the halogen-containing oxidant with a nitrogen source, to thereby produce the haloamine solution. In another embodiment, both reactions may be combined into a single step.

The present invention also provides haloamine solution with no measurable amounts of halogen polyoxyanions.

Further objects, features, and advantages of the present invention will become apparent from a review of the detailed description that follows.

DETAILED DESCRIPTION OF THE INVENTION

Figure 1:
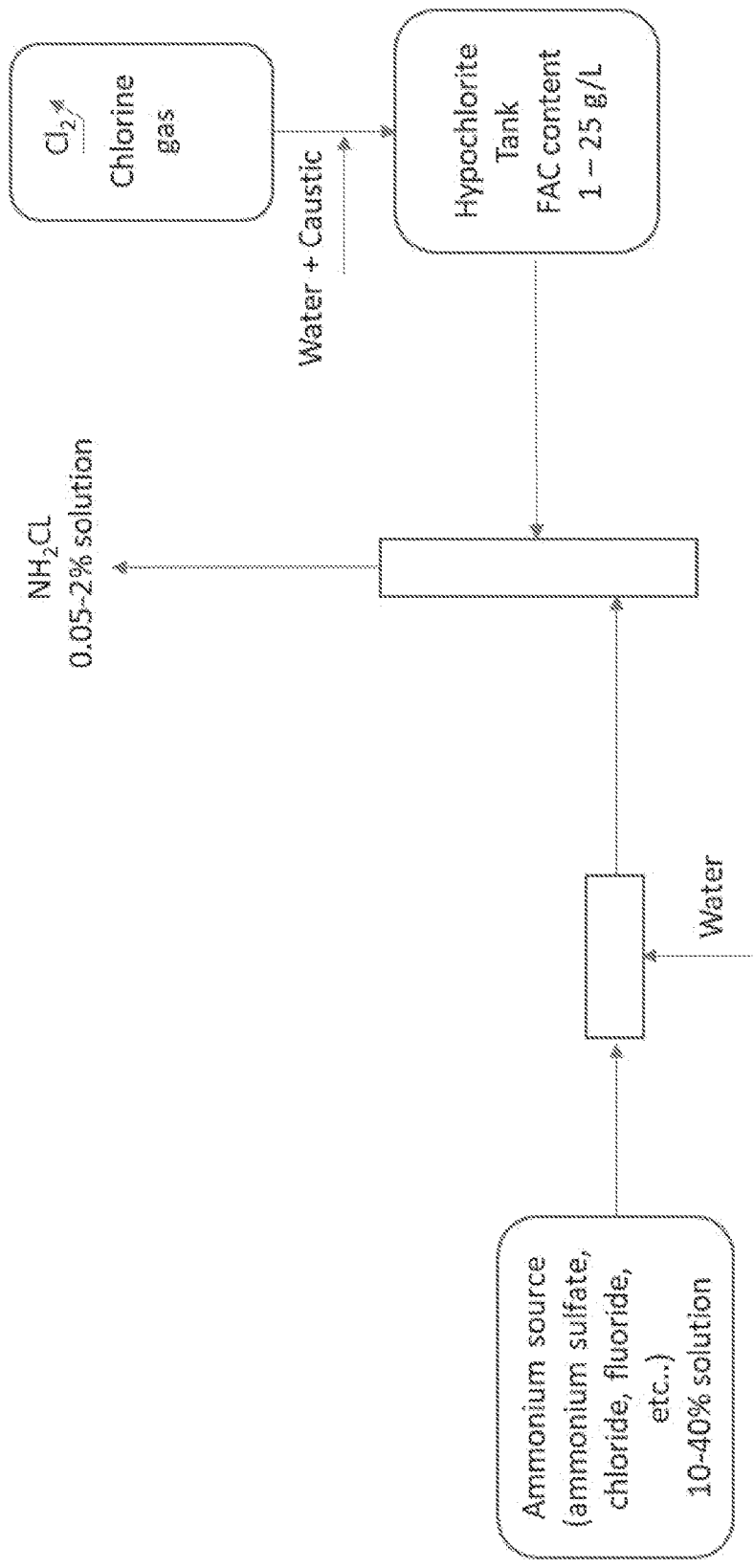
FIG. 1 shows production of monochloramine from a dilute hypochlorite solution obtained using a source of gaseous chlorine. FAC—Free Active Chlorine.

The present invention is directed to online production of biocidal haloamines solutions with reduced amounts of halogen polyoxyanions, preferably that are substantially free of halogen polyoxyanions. For example, the formed solutions should contain less than 20% by weight of halogen polyoxyanions such as chlorates, for example, less than 10% by weight, or less than 5% by weight, or less than 1% by weight, or less than 0.1% by weight, or less than 0.01 percent, or less than 0.0001 percent by weight of halogen polyoxyanions, such as chlorates, or no measurable amount of any halogen polyoxyanions or chlorates. The present methods provide a haloamine product for which the risks to human health related to the presence of halogen polyoxyanions such as chlorate are effectively reduced or eliminated.

This invention is often described herein with specific reference to monochoramine as the haloamine. However, this invention will be understood as applicable to other haloamines, such as other chloramines and bromamines, such as monobromamine. Also, the invention reduces the amount of chlorate anion, or the analogous bromate anion, depending on the halogen-containing precursors used and depending if sodium salts or another starting compound is used. The methods can reduce all halogen polyoxyanions, and preferably produce haloamines solutions free of halogen polyoxyanions of any type.

The most common of biocidal haloamines, chloramine solutions, can be produced by combining bleach (a solution of sodium hypochlorite, NaOCl) with an ammonia-containing solution. Formation of monochloramine, the most efficacious of biocidal chloramines, proceeds according to the following overall reaction:

$$NaOCl + NH_3 \rightarrow NH_2Cl + NaOH$$

The ammonia-containing solution may vary between an ammonium carbamate solution, an ammonium bromide solution, and an ammonium sulfate solution and others. For example, any desired source of nitrogen can be used, including ammonium salts. Commercial bleach is intended to deliver a certain concentration of hypochlorite ion. However, during storage, hypochlorite ($OCl^-$) decomposes with formation of chlorine polyoxyanions such as chlorite ($ClO_2^-$) and further into chlorate ($ClO_3^-$) via the following disproportionation reaction:

$$2OCl^- \rightarrow ClO_2^- + Cl^-$$

$$ClO_2^- + OCl^- \rightarrow ClO_3^- + Cl^-$$

Overall Reaction:

$$3OCl^- \rightarrow ClO_3^- + 2Cl^-$$

Perchlorate Ion Forms as a Result of Interaction Between Hypochlorite and Chlorate:

$$OCl^- + ClO_3^- \rightarrow ClO_4^- + Cl^-$$

At room temperature (25° C.), about 50% of hypochlorite in commercial bleach (12-13 weight %) decomposes within 150-160 days. Chlorate is the most abundant decomposition product present in commercial bleach at as high as 20%. In solutions, any halogen oxyanions are balanced by available metal cations, with cations of transition metals such as iron or manganese, if present, accelerating increasing hypohalite decomposition by more than 10 times.

The present invention provides methods of producing haloamines which result in a significantly reduced content of halogen polyoxyanions. In particular, the present method uses hypochlorite produced in-situ, which contains less of the undesired by-product chlorate anions. The produced hypochlorite can be used directly and immediately such that undesired chlorate anions are not formed.

The hypochlorite used in the invention can be produced using a number of in-situ methods including reacting chlorine gas with caustic soda, or by reacting chlorinated hydantoin (e.g., 1,3-dibromo-5,5-dimethylhydantoin, 1,3-dichloro-5,5-dimethylhydantoin, or 1-bromo-3-chloro-5,5-dimethylhydantoin) compounds with water, or by electrolysis of a sodium chloride solution. In certain embodiments, electrolysis or passing an electric current through a solution is not used in any stage of the method, for example, not used to produce chlorine or the hypochlorite. The ammonia-containing component then reacts with, and converts, the sodium hypochlorite to monochloramine having biocidal properties.

The reaction of the ammonia-containing component and the in-situ generated sodium hypochlorite can be controlled to achieve a quantitative conversion of sodium hypochlorite to monochloramine (i.e., a reaction yield of at least about 95 percent, preferably at least about 97 percent). Control of the reaction can avoid production of unwanted byproducts, such as dichloramine and nitrogen trichloride.

For example, (a) an excess of ammonia, or at least no excess hypochlorite can be used; and/or (b) an alkaline pH, preferably at least about 10 to about 11 can be used. With these reaction controls, the conversion of sodium hypochlorite to monochloramine can be about 95 percent, or 97% or higher. The produced monochloramine solution can contain, for example, 0.0001 to 10% or 0.05 to 5% or 0.05 to 2% by weight of MCA.

In one embodiment of the present invention, shown in FIG. 1, the hypochlorite solution is produced by reacting chlorine gas with an alkaline solution. Any desired alkaline solution can be used. The chlorine gas can be provided in a compressed form. The reaction of chlorine gas can be conducted using a continuous or intermittent process with the resulting hypochlorite solution accumulated, for example, in a storage tank downstream from the gas source and/or by mixing chlorine gas with alkaline water in such an intermediate tank. Preparing concentrated solutions of hypochlorite is not necessary. In fact, only a dilute solution, with hypochlorite concentration in the range 0.5-25 g/L, or 1-25 g/L or 2-10 g/L or 1-5 g/L is advantageously needed. Such a concentration is more than 5 times lower than that of the most common commercial 125 g/L hypochlorite solution. The hypochlorite tank volume and residence time should be selected to ensure the proper retention time of hypochlorite solution to avoid chlorate formation.

The ammonium ion containing solution can be prepared in a separate tank using any suitable ammonium source including, for example, ammonia, aqueous ammonia, ammonium sulfate, ammonium phosphate, ammonium chloride, and ammonium fluoride. The source of ammonia can be provided by many different ammonia-containing components. For example, the ammonia source may be the Busan® 1474 product, which is commercially available from Buckman Laboratories (Memphis, Tenn.) and is a blend of ammonia-containing compounds containing a total of 7.59% ammonia.

Figure 2:
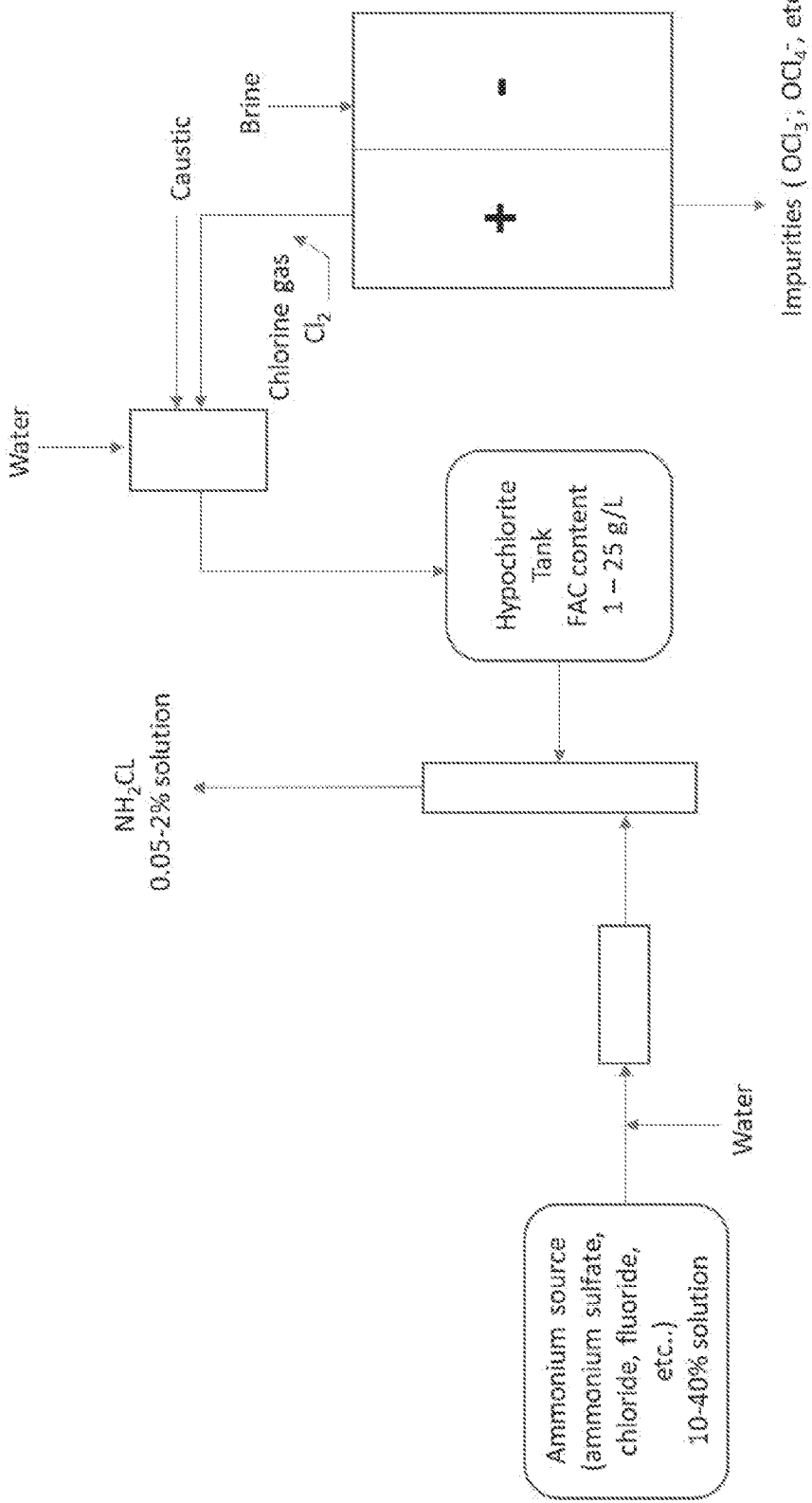
FIG. 2 shows production of monochloramine from a dilute hypochlorite solution obtained using electrolytically generated chlorine gas

In another embodiment of the present invention, shown in FIG. 2, a suitable chloramine solution is produced using a dilute hypochlorite solution obtained from a mixture of caustic, water, and chlorine gas, wherein the latter is generated electrolytically. The hypochlorite solution is accumulated at a minimal volume in an intermediate tank and/or fed directly into a chloramines generator.

Figure 3:
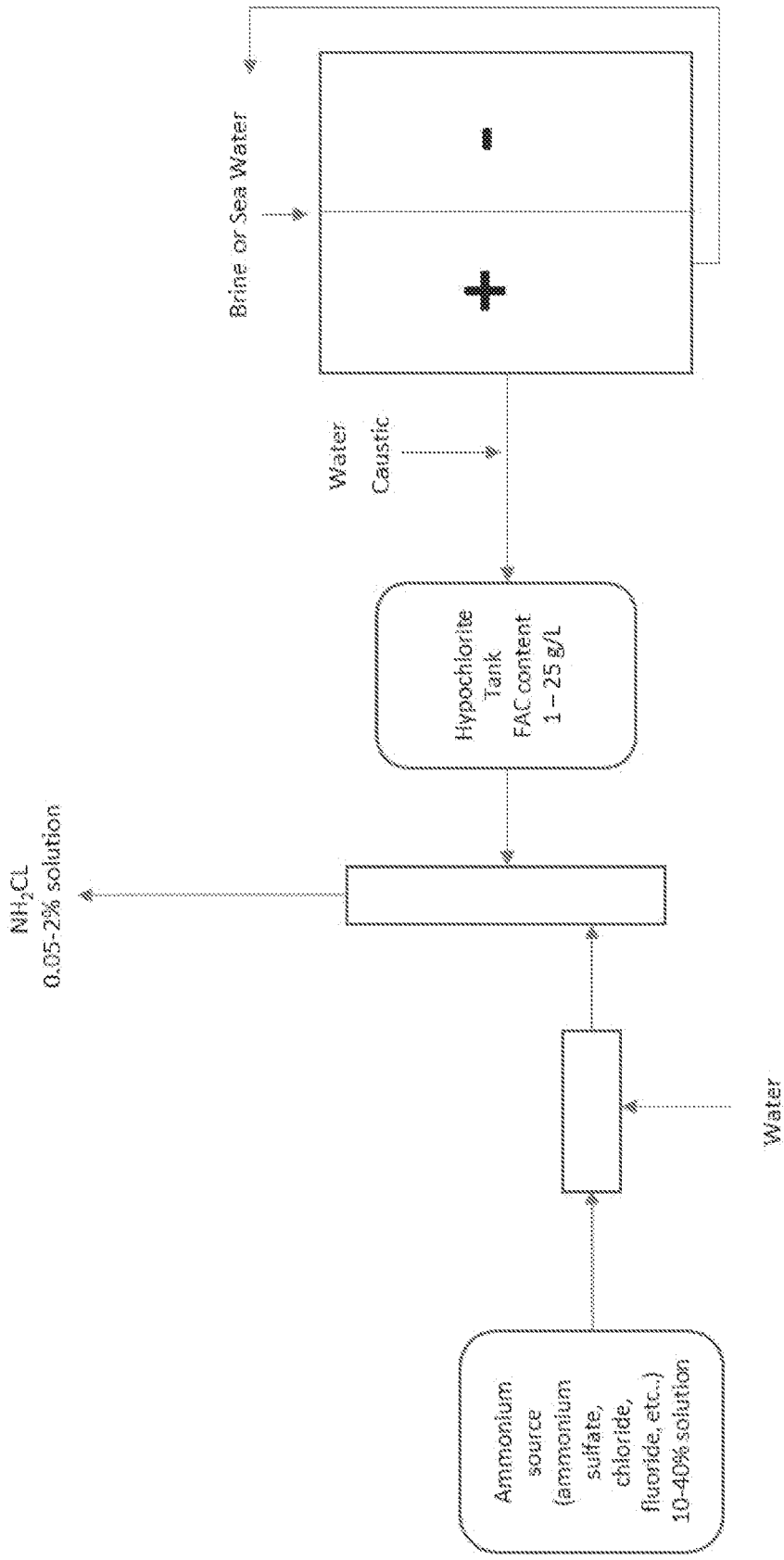
FIG. 3 shows production of monochloramine from a dilute hypochlorite solution obtained using a brine or sea water electrolyzer.

In yet another embodiment of the present invention, shown in FIG. 3, a suitable chloramines solution is produced using a dilute hypochlorite solution instantly delivered by an electrolytic generator/electrolyzer. Suitable electrolyzers are available commercially from such suppliers as Electrolytic Technologies Systems LLC, North Miami Beach, Fla., MIOX Corporation, Albuquerque, N. Mex., or VDH Products, Roden, Drenthe, Netherlands. The electrolyzers produce hypochlorite solutions using salt brines or sea water. The electrolyzer output can optionally be adjusted to proper pH such as 9-12 or 11-12, with caustic and water and accumulated in an intermediate tank or fed directly into a chloramines generator. Alternatively, the hypochlorite solution can be fed directly into a chloramines generator without any time in an intermediate tank.

Figure 4:
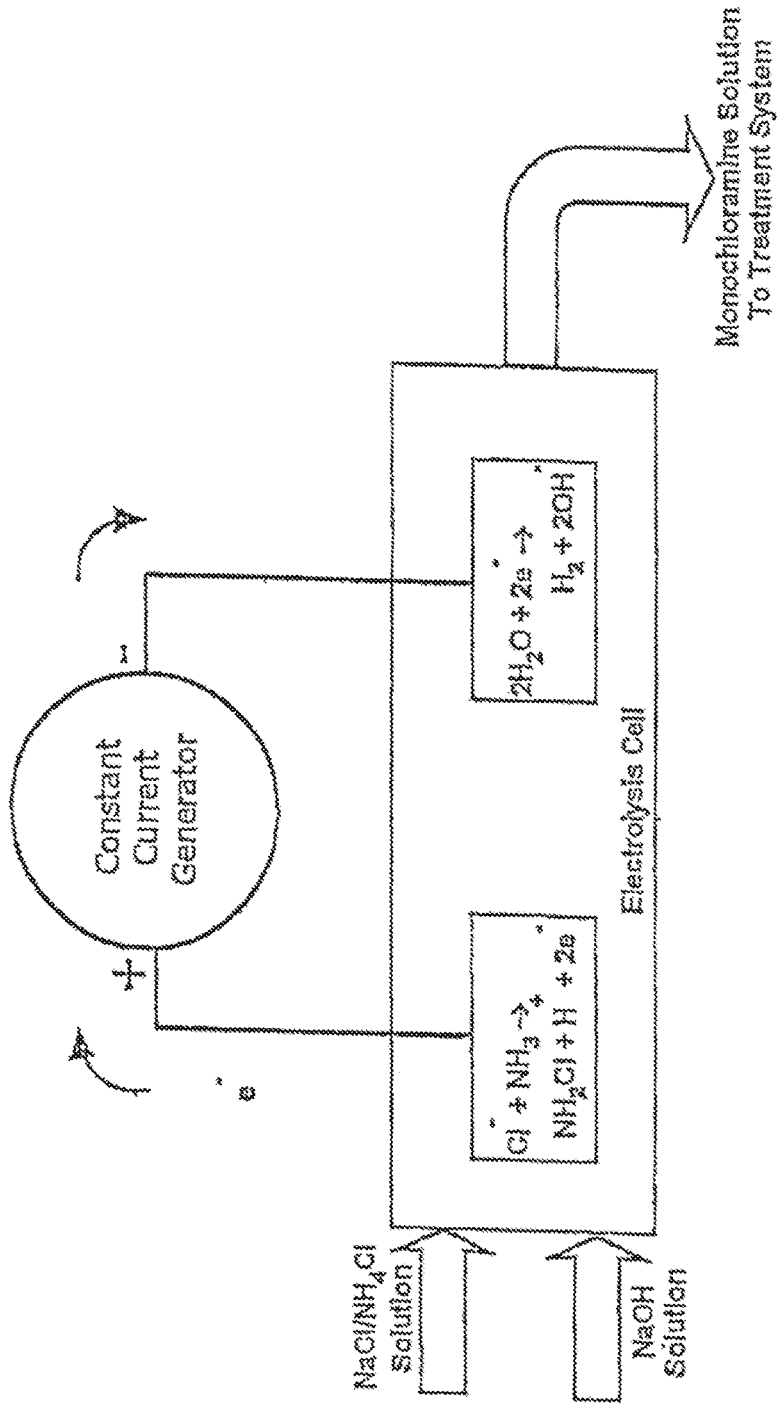
FIG. 4 shows production of monochloramine without the use of an intermediate tank.

In yet another embodiment, the chloramine producing reactions are combined into a single step as shown in FIG. 4. In such a method, electrolysis or passing an electric current through a solution is not used to produce chlorine gas or hypochlorite solution in an intermediate upstream stage.

Figure 5:
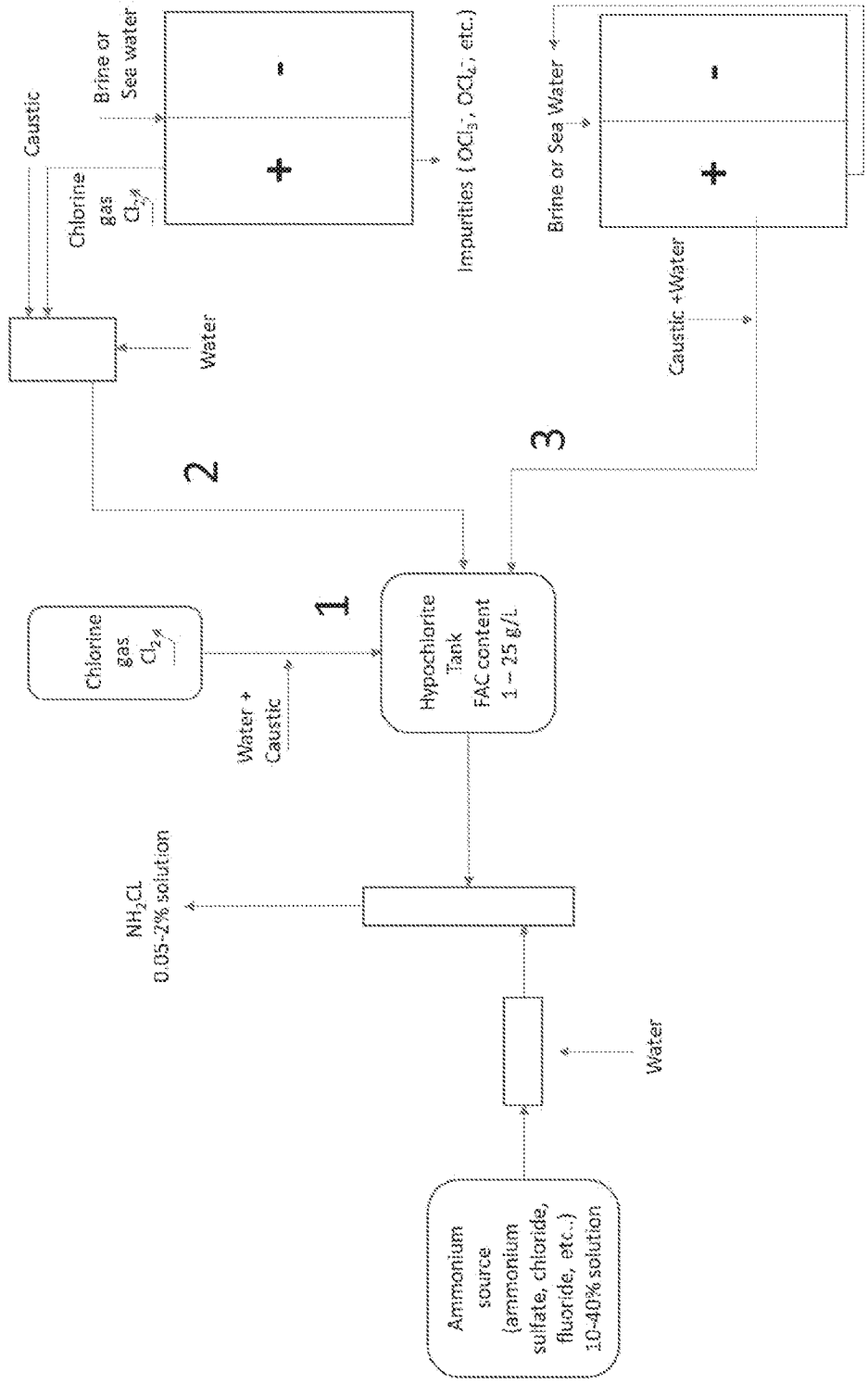
FIG. 5 shows production of monochloramine from a dilute hypochlorite solution obtained simultaneously or intermittently from a number of sources selected but not limited to a group of those using 1) chlorine gas, 2) an electrolytic chlorine gas generator, or 3) an electrolytic hypochlorite generator.

In yet another embodiment, the present invention can be realized using a system comprising one or more or all the above configurations as shown in FIG. 5. Thus, the dilute hypochlorite solution can be obtained simultaneously or intermittently from a number of sources selected but not limited to a group of those using chlorine gas, an electrolytic chlorine gas generator, or an electrolytic hypochlorite generator.

The present invention provides on-site generation of halogen-containing oxidant solutions such as hypochlorite solutions using any of the above methods, which then can be used immediately to produce biocidal haloamines. Such immediate conversion with no storage period of the hypochlorite solutions eliminates formation of harmful halogen polyoxyanions, such as chlorates. In some embodiments, there is no storage period, and in others, a short storage period (for example, less than an hour), in an intermediate tank can be used. Such a short residence time, especially with the lower concentration hypochlorite solutions that can be used in the invention, reduces or eliminates the formation of harmful chlorates.

The haloamines, such as chloramines, and solutions thereof produced in the present invention can be used anywhere such biocides are used. For example, biocidal haloamine applications in food processing and sanitation industry are known. The invention can be used in all current haloamine applications, especially including those regulated for the presence of chlorate or other halogen polyoxyanions, such as at starch and sugar mills, in brewing industry, bioethanol plants, the oil and gas industry, and swimming pools.

The present invention is especially useful in the food processing industry. The flexible methods of the present invention produce the lowest possible chlorate level in the chloramine solutions produced.

Advantageously, many different on-site methods of producing the hypochlorite can be used, including use of a gaseous chlorine as a source of hypochlorite instead of or in combination with an electrolytic generator. Also, a stand-alone electrolytic generator of chlorine gas can be used instead of or in addition to electrolytic generation of hypochlorite solutions.

The present invention is flexible in that an optional intermediate hypochlorite tank having a low residence time (for example, less than 48 hours, or less than 24 hours, or less than one hour, or less than half an hour, or less than 15 minutes, or less than 1 minute, such as one minute to 48 hours or 15 minutes to 24 hours) can be used. Furthermore, commercial hypochlorite generators can be used without regard to the actual method utilized to generate hypochlorite.

Example 1

An embodiment of the present invention was tested for treating microbial contamination at a facility processing of starch into a value-added food and nutrition products. The haloamine producing unit was set up utilizing an electrolytic chlorine gas generator in accordance with the diagram provided in FIG. 2. The gaseous chlorine from the generator was combined with a sodium hydroxide solution to form a hypochlorite solution in a storage tank with about 1-hour residence time. The free active chlorine concentration in the tank was in the 2-9 g/L range. The chlorate content in the tank was in the range of 100-500 mg per kg of Free Active Chlorine. The produced haloamine solution contained a very low amount of halogen polyoxyanions. The chlorate levels measured in the processed starch were below 0.7 mg/L.

This invention has been described with particular reference to certain embodiments, but variations and modifications can be made without departing from the spirit and scope of the invention.

The invention claimed is:

1. A method for producing a haloamine solution with reduced amounts of halogen polyoxyanions comprising
   (a) on-site generation of a halogen-containing oxidant solution,
      wherein the halogen-containing oxidant solution contains hypohalite, and
   (b) reacting on-site the on-site generated halogen-containing oxidant with a nitrogen source, to thereby produce the haloamine solution with reduced amounts of halogen polyoxyanions,
      wherein the on-site generation comprises reacting chlorine gas with an alkaline solution,
      wherein the haloamine solution comprises less than 5% by weight of halogen polyoxyanions.

2. The method according to claim 1, wherein the haloamine comprises monochloramine (MCA).

3. The method according to claim 1, wherein the nitrogen source is ammonia, an ammonia solution, or an ammonium salt.

4. The method according to claim 1, wherein the on-site generation comprises electrolysis of a sodium chloride solution.

5. The method according to claim 1, wherein the on-site generation comprises generating chlorine gas electrolytically and reacting the chlorine gas with a mixture of caustic and water.

6. The method according to claim 1, wherein the halogen-containing oxidant solution contains a hypohalite that is hypochlorite.

7. The method according to claim 1, wherein the halogen-containing oxidant solution is a dilute solution having a hypochlorite concentration of 1-25 g/L.

8. The method according to claim 1, wherein the on-site generation comprises electrolysis of sea water or salt brine.

9. The method according to claim 1, wherein the halogen-containing oxidant solution generated on-site is fed directly, without storage, into a haloamine generator and reacted with the nitrogen source.

10. The method according to claim 1, wherein the hypohalite solution generated on-site is accumulated into an intermediate tank for up to 24 hours and then fed to a chloramine generator and reacted with the nitrogen source.

11. The method according to claim 1, wherein hypohalite solution generated on-site is used immediately to produce the haloamine, thereby eliminating formation of halogen oxyanions containing more than one oxygen atom.

* * * * *